United States Patent [19]

Miura et al.

[11] 4,039,447

[45] Aug. 2, 1977

[54] WASTE WATER TREATMENT METHOD AND APPARATUS

[75] Inventors: Mitugi Miura, Osakasi; Hisao Matubayasi, Tokyoto; Syojiro Iwai, Osakafu, all of Japan

[73] Assignee: Miura Engineering International Company Ltd., Osaka, Japan

[21] Appl. No.: 632,074

[22] Filed: Nov. 14, 1975

[30] Foreign Application Priority Data

| Nov. 15, 1974 | Japan | 49-132366 |
| Dec. 26, 1974 | Japan | 50-681 |
| Mar. 8, 1975 | Japan | 50-28316 |
| Sept. 10, 1975 | Japan | 50-110348 |

[51] Int. Cl.² .......................... C02B 1/20; B01D 35/06
[52] U.S. Cl. ................................. 210/42 S; 210/223
[58] Field of Search ............... 210/42 S, 49, 222, 223

[56] References Cited

U.S. PATENT DOCUMENTS

| 2,768,746 | 10/1956 | Colburn | 210/42 |
| 3,399,134 | 8/1968 | Schouw et al. | 210/42 |
| 3,441,502 | 4/1969 | Tenorio | 210/222 |
| 3,697,420 | 10/1972 | Blairdell et al. | 210/42 |
| 3,959,145 | 5/1976 | Lundquist et al. | 210/223 |

*Primary Examiner*—Thomas G. Wyse
*Attorney, Agent, or Firm*—Browdy and Neimark

[57] ABSTRACT

A waste water treatment method and apparatus where ferromagnetic powder is added to the waste water and solids suspended in the waste water are formed into coagulated flocs, and the flocs are magnetically attracted and deposited on magnet plates so as to remove the solids from the waste water, thereby purifying the waste water. The magnetic powder can be recovered for reuse.

9 Claims, 10 Drawing Figures

WASTE WATER TREATMENT METHOD AND APPARATUS

FIELD OF THE INVENTION

The invention relates to a waste water treatment method and apparatus in which waste water containing finely divided solid substances is flocculated by adding ferromagnetic powder, e.g., magnetite, and then a coagulating agent, to remove said solid substances in waste water by means of rotary magnet plates while recovering iron powder for reuse, thereby to purify the waste water and discharge thus purified water.

BACKGROUND OF THE INVENTION

The most popular waste water treatment methods of the prior art are classified into the following two types: a type in which the coagulating agent is first added to the waste water and then the produced flocs are precipitated; and a type in which air is introduced into water after adding a coagulating agent to let the produced flocs float up.

According to the former type of method, the precipitated dense sludge is removed out of the system by using a thickener, while in the latter type of method the floated sludge is taken out of the treating plant by scumming, using a flotator or the like. However, both thickener and flotator devices have deficiencies, e.g. they are costly to install, operation time is extensive, sludge produced has too much water content, the turbidity of the purified water is a little higher, large floor space is required, and such devices are also high in operating cost. Further, since the concentrated sludge contains large quantities of water (e.g. 98–99%), the sludge needs to be dehydrated by using a filter press, Oliver filter or other like means, and the resultant treated water still has turbidity on the order of 10 ppm. Therefore, such treated water must be subjected to further filtration for obtaining high purity water.

SUMMARY OF THE INVENTION

An object of the present invention is to solve the problems involved in the waste water treatment methods and apparatus according to the conventional techniques; a further object in conjunction with the first object is to provide an excellent waste water treatment system by utilizing ferromagnetic powders or the like and a coagulant; a further object is to recover the used ferromagnetic powders for reuse from the economical standpoint; and yet another object is to provide techniques that permit separation and reutilization of the used ferromagnetic powders.

In accordance with the present invention, co-coagulated flocs of ferromagnetic powders and suspended fine solids contained in the waste water are magnetically attracted to magnetic plates and thereby removed from the waste water to obtain purified water.

BRIEF DESCRIPTION OF THE DRAWING

For better understanding of the invention possible embodiments thereof will now be described with reference to the attached drawings, it being understood that these embodiments are to be intended as merely exemplary and in no way limitative.

DETAILED DESCRIPTION OF EMBODIMENTS

Figure 3:
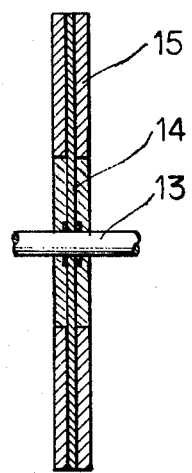
FIG. 3 is a cross-sectional view of one of the magnetic discs used in the apparatus of FIG. 2.

Now an illustrative embodiment of the present invention is described with reference to FIGS. 1, 2 and 3 of the acompanying drawings.

Raw water and suspension of ferromagnetic powders such as magnetite from a ferromagnetic powder suspension tank 2 are drawn simultaneously by a raw water feed pump 1 and guided into a suitable pipe mixer 3 for mixing under agitation therein. In the meantime, a known inorganic coagulating agent, such as aluminum sulfate or polyaluminum chloride, contained in a tank 5 is forced into a conduit 4 by a pump 6, and the liquids are mixed under agitation in a pipe mixer 7. Further, a known high molecular coagulating agent contained in a tank 9 is charged into a conduit 8 by a pump 10 and mixed up with the liquids in a pipe mixer 11 or the like so that the mixture of ferromagnetic powder and suspended solids in the waste water undergoes co-flocculation, and water containing the so produced co-coagulated flocs (hereinafter "co-flocs") is guided into a separation tank 12.

The ferromagnetic powders may be either added to waste water and then subjected to flocculation treatment by addition of a coagulating agent as described above, or may be added to waste water which has already undergone the coagulating treatment. It will be understood that the use of coagulating agents is dictated by the nature of the waste water, either one or both types of coagulants being optional or unnecessary is some cases. Furthermore, if the suspended solids are already magnetic, e.g. waste water from iron and steel manufacturing plants, the addition of ferromagnetic powder is not necessary.

When supplied waste water descends into the separation tank 12, the co-flocs of the ferromagnetic powder and suspended solids in the waste water deposit on suitably maintained magnetic means such as magnet discs 14, rotatably carried on a shaft 13, and the flocculated fine solids are separated from the descending water flow at a high rate of more than 99%. Magnetic plates 15 and non-magnetic sections 16 are alternately arranged in the periphery of each disc 14. Each rotary disc 14 has its lower part immersed in the waste water and has its upper part emerged in the air. It has been experimentally ensured that co-flocs are easily and completely, magnetically attracted to magnetic plates.

Figure 1:
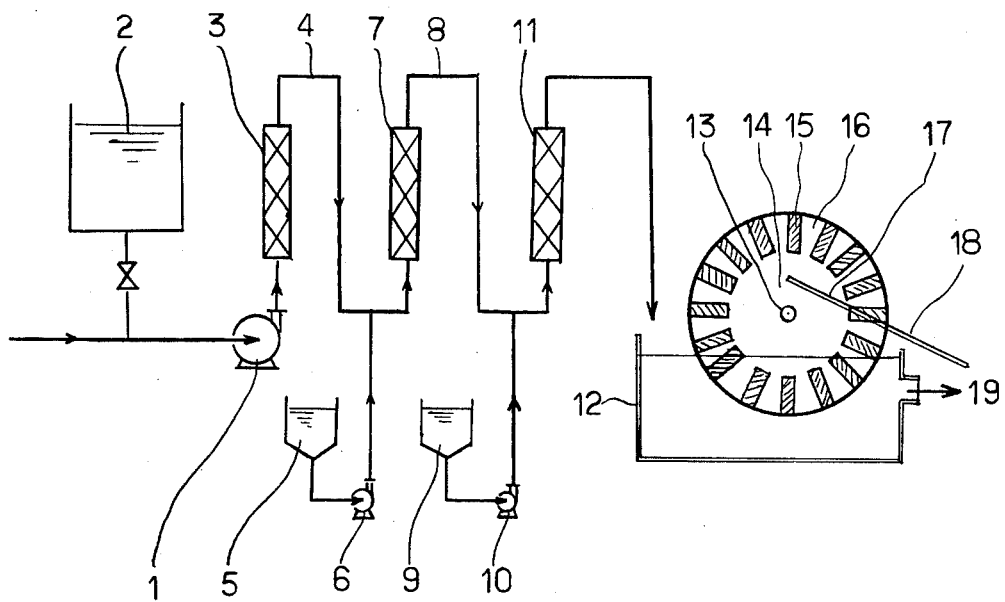
FIG. 1 is a schematic drawing illustrating an embodiment of a process in accordance with the present invention.
Figure 2:
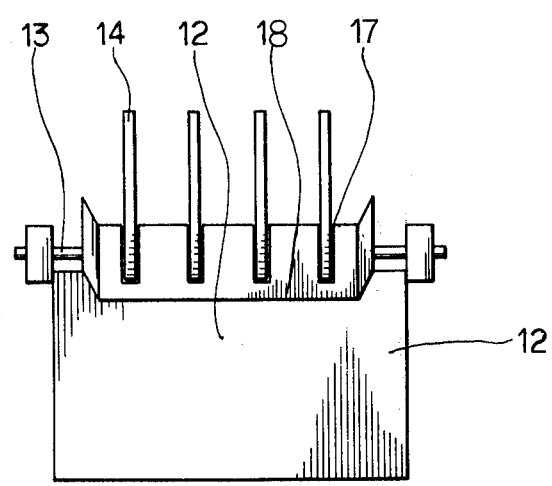
FIG. 2 is a schematic front view showing an example of a separated substance removing apparatus.

In the embodiment of FIG. 1, the thick build-up of co-floc on each disc 14 is scraped off after each disc rotatably emerged from the tank 12, this being accomplished by a scraper 17 made of a plate which has a groove as wide as that of a disc. This causes removal of co-flocs on the magnetic plates when the magnetic plates pass through the groove by rotation of the disc. The scraped off co-flocs slide down into the tank along a sliding plate 18.

In summary, supplied waste water containing co-flocs of ferromagnetic powders and suspended fine solids will come into the tank 12. Co-flocs will be attracted to magnetic plates 15 on the discs 14 when they are in the water phase and the co-flocs on the magnetic plates emerge in the air by means of the rotation of a rotary disc 14 and then they will be scraped off the disc by a scraper 17. Purified water, after co-flocs have been so removed, will be discharged through a pipe 19. Suspended solid removing efficiency is more than 99% and the so treated purified water is quite clean as the content of impurities is less than a few ppm.

In the embodiment of FIG. 1, the thick build-up of flocs on each magnet plate 15 is scraped off after removing each magnet plate from the separation tank 12. It is to be noted that, according to this method of the present invention, the water content in the scraped off co-flocs is so low in comparison with conventional thickener that in the case of small volume of liquid to be treated there is no need of performing any additional dehydration by a filter or other means. a plurality of the discs 14 on a shaft 13 in the separation tank 12, with the magnet plates 15 being magnetically attached to the surface of each said rotating disc 14 as shown in FIG. 3.

If the entire periphery of a disc 14 has magnetic tractive force, co-flocs will be scraped, but will be difficult to remove from the disc, only sliding over the surface of the disc, because in such a case the co-floc is always in contact with the disc having magnetic tractive force. However, in FIG. 1, when the co-floc attracted to the magnetic plates 15 is scraped off by scraper 17, it arrives at an adjacent non-magnetic section 16 between the magnetic plates 15, and will consequently fall down because non-magnetic section 16 has no magnetic tractive force.

Discharge of the separated flocs in the form as they are, involves the problems of increased volume of waste disposal and elevated running cost of ferromagnetic powders. Therefore, if the ferromagnetic powders can be separated from the co-floc, it will decrease the volume of wastes and reduce the cost for the ferromagnetic powders, and also in case the co-flocs include valuable solids, they can be recovered for reuse.

The separated flocs usually have as high as 80% water content, so that if subjected to violent mechanical agitation or ultrasonic vibration, the co-flocs are smashed to form a suspension where the ferromagnetic particles and suspended solids exist separately. This provides a procedure for recovering the magnetic particles. Thus, this suspension may be supplied to a separation tank where the ferromagnetic powders are magnetically attracted and attached to the liquid-immersed portion of each electromagnet- or permanent-magnet-made rotary disc, and upon emerging into the air with rotation of said plate, the deposited ferromagnetic powders are scaped off by a suitable scraper for recovering the ferromagnetic powders. In this case, suspended impurity solids do not deposit on the magnetic plates because such impurities have no magnetism, and hence the ferromagnetic powders alone are recovered.

Figure 4:
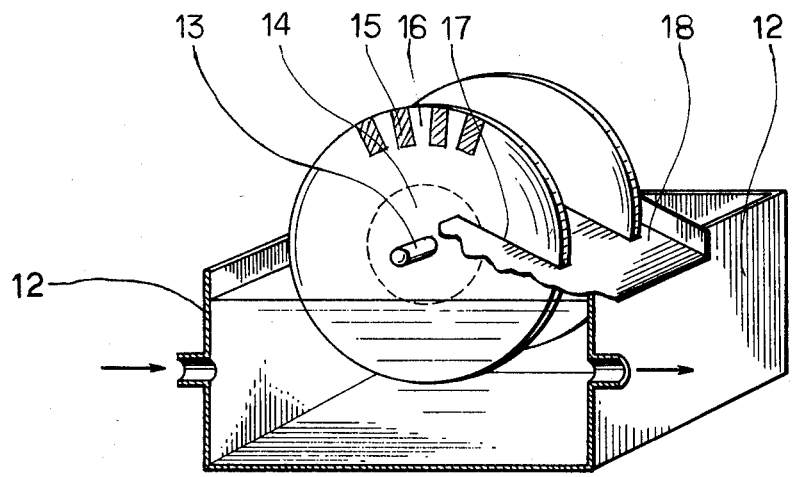
FIG. 4 is a perspective view, with parts broken away, of another example of a removing apparatus.
Figure 10:
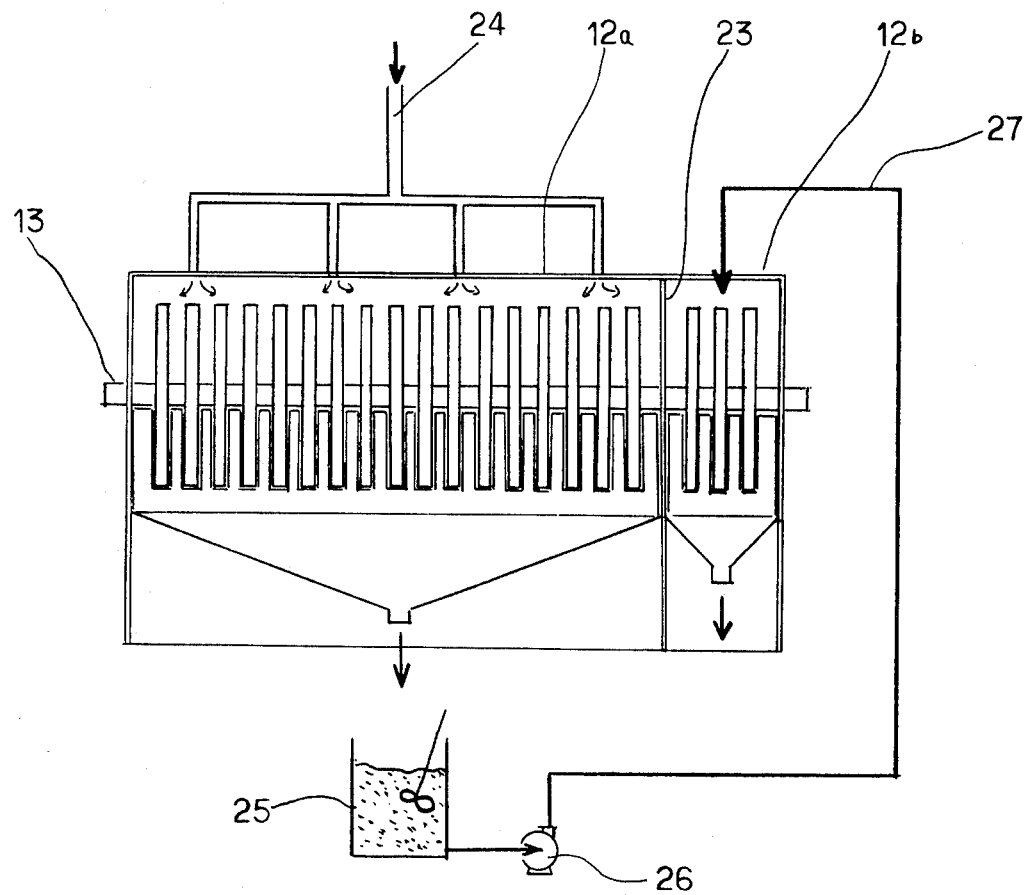
FIG. 10 is a partial cross section and partial schematic view showing a system in accordance with the present invention.

Another separation apparatus for small volume usage as shown in FIG. 4, may be used to recover ferromagnetic powders from co-flocs following the waste water treatment using a larger apparatus. As an alternative, however, an apparatus as shown in FIG. 10 may be used to reduce the cost of installation. A tank is divided by a partition plate 23 into a larger chamber 12a comprising a relatively large number of discs and a smaller chamber 12b comprising a small number of discs. The discs in both chambers are simultaneously rotated by a single shaft 13. The large chamber 12a is used for magnetically attracting and separating the treated co-flocs in the waste water carried through a pipe 24. The scraped-off co-flocs are carried to a co-floc smashing tank 25 where co-flocs are broken and a small quantity of water containing these broken ferromagnetic powders and suspended solids is passed through a pipe 27 by a pump 26 into the smaller chamber 12b in which ferromagnetic powders alone are separated by magnetism. Thus, the treatment of a large quantity of waste water is carried on in the chamber 12a and the treatment of a small quantity of water for recovering ferromagnetic powders is carried on by discs revolving in the chamber 12b and the discs in both chambers are revolved by a single shaft. Since the two treatments for treating waste water and recovering ferromagnetic powders can be simultaneously carried on by the discs in the two chambers 12a, 12b revolved by means of a single shaft, the cost of installation becomes low.

Figure 5:
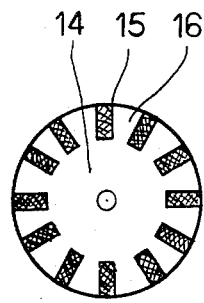
FIG. 5 is an illustrative front view of a disc made of non-magnetic material having inlayed magnets used in still another example of a removing apparatus.
Figure 6:
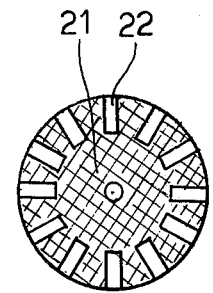
FIG. 6 is an illustrative front view of a disc made of magnetic material having inlayed non-metallic elements.

There are various types of construction of a disc used in the present invention as shown in FIG. 5 to FIG. 9. In FIG. 5, permanent magnetic plates 15 are arranged at an interval in the periphery of a disc 14 formed of non-magnetic material such as a plastic disc or wooden disc. In FIG. 6, non-magnetic plates 22 such as plastic plates or wooden plates are arranged at an interval in the periphery of permanent magnetic disc or electromagnetic disc 21. Both discs shown in FIGS. 5 and 6 may be used in the same manner in the present invention.

In the case of the latter construction, the co-floc magnetically attached to the magnetic portion of each disc in the liquid is scraped off by a scraper as such magnetically attached co-floc arrives at the scraper with the turning of the disc. At this point, however, the co-floc is hard to separate perfectly due to magnetic attraction of the disc, but when a non-magnetic plate portion 22 reaches the scraper with further turn of the disc, any magnetic attraction between the disc and the co-floc is lost, and hence the co-floc is easily separated from the disc and dropped onto a chute for discharge.

Similarly, in the case of FIG. 5, the co-floc magnetically attached to each magnet 15 in each rotary disc in the liquid is scraped off upon reaching the scraper with turning of the disc, but at this point, it is hard to perfectly separate the object matter due to magnetic attraction of the magnet 15. However, when a non-magnetic portion 16 reaches the scraper with further turning of the disc, any magnetic attraction of the disc to the object matter vanishes, so that the object matter is easily separated from the disc and dropped onto a chute.

Although easy separation of the object matter from each rotating disc can be accomplished by the scraper in any of the above-said methods, a particularly high separating effect can be obtained by inlaying the permanent magnet pieces in the periphery of each non-magnetic plate.

Figure 7:
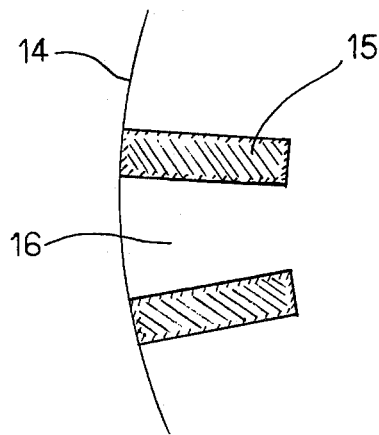
FIG. 7 is a partial illustrative magnified view of the device in FIG. 5.
Figure 8:
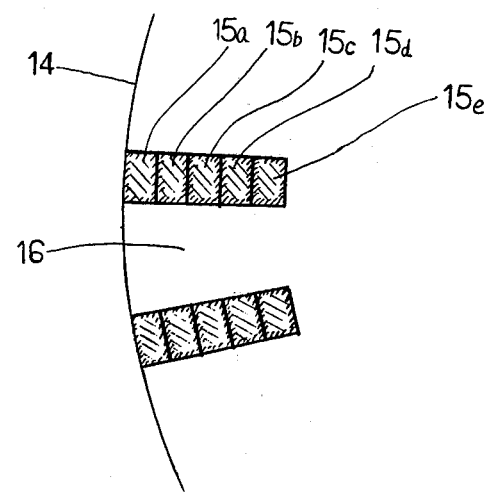
FIG. 8 is a partial illustrative drawing of a disc with an arrangement of magnetic plates composed of small blocks.
Figure 9:
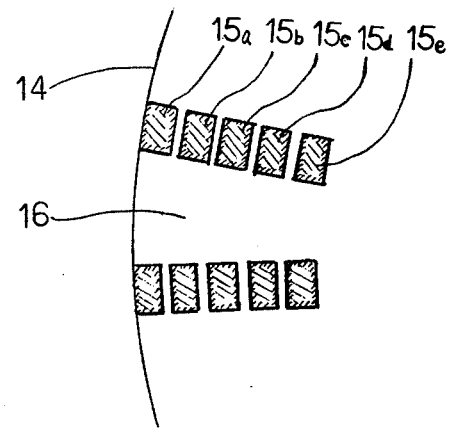
FIG. 9 is a drawing similar to FIG. 8 showing a disc with modified arrangement of magnets.

FIG. 7 is an enlargement of FIG. 5 and shows a non-magnetic disc in which each of the permanent magnet plates 15 embedded in the periphery of the disc is made from a single block or piece of permanent magnet, and FIGS. 8 and 9 show discs in which each of the permanent magnet plates is composed of several permanent magnet pieces 15a, 15b, 15c, 15d, 15e, etc. arranged in contact with each other (FIG. 8) or spaced apart from each other (FIG. 9). Each permanent magnet plate has the disposition that it forms a thicker build-up at the peripheral portion shown by the short oblique lines and a thinner build-up at the central portion shown by the longer oblique lines. Therefore, if a plurality of small permanent magnet pieces 15a, 15b, etc. are arranged side by side for forming each magnetic strip as shown in FIGS. 8 and 9, the area in which a thicker build-up is formed is enlarged to increase the amount of co-floc collected, resulting in increased throughput. This arrangement, therefore, has many advantages such as easier separation of the object matter by the scraper, stronger magnetic attachment of the object matter which has settled in the liquid tank and a greater amount of collection of object matter in the same areas compared with FIG. 7.

From the separated co-flocs, the ferromagnetic powder, if necessary can be recovered for reuse.

As apparent from the foregoing description, the method of the present invention requires no large-capacity thickener as necessitated in the conventional precipitation method or large capacity flotator as necessitated in the floating method as well as no dehydrating means for treating the sediments or floated-up substances so that the equipment cost is reduced and the floor space required for installation of the apparatus is lessened. Also, since solid-liquid separation is accomplished by forming flocs by adding magnetic iron powders and coagulant(s), waste water disposal can be conducted at extremely high efficiency. Since the present invention utilizes magnetic tractive force, it takes only a few seconds to separate suspended solids, while it takes about one hour for conventional thickener or flotator.

Further, it is possible to recover iron powders alone for the purpose of reuse. This is a very meritorious point of this invention from the viewpoint of saving of the resources. Moreover, according to the method of the present invention, separation of flocs from the rotating plates provided for collecting flocs from waste water can be accomplished with ease by use of scrapers or other means since magnetic pieces are embedded at suitable intervals in the periphery of each non-magnetic disc.

It will be obvious to those skilled in the art that various changes may be made without departing from the scope of the invention and the invention is not to be considered limited to what is shown in the drawing and described in the specification.

What is claimed is:

1. A waste water treatment method, utilizing magnetic powder, which comprises the steps of:
continuously feeding waste water, to which has been added magnetic powder and which has been subjected to a flocculation treatment, into the large chamber of a tank having a large chamber separated from a small chamber by a partition, the tank having a plurality of rotating rotary magnetic discs arranged therein on a single shaft of rotation extending through both chambers thereof, some of said discs being in said large chamber and a smaller number of said discs being in said small chamber;
collecting the co-flocs of magnetic powder and suspended solids from the waste water on said magnetic discs in the large chamber, as they rotate;
removing the co-flocs from the magnetic discs in the large chamber and continuously discharging the resultant water therefrom;
agitating the removed co-flocs in a separate chamber to destroy the co-flocs;
feeding the deflocculated magnetic powder and suspended solids to the small chamber of said tank; and
separating the magnetic powder from the suspended solids by collecting the magnetic powder on said magnetic discs and removing the magnetic powder therefrom.

2. A method in accordance with claim 1 wherein each of said rotating magnetic discs has magnetizable blocks or strips and non-magnetizable parts arranged alternately at the periphery thereof whereby the suspended solids in waste water are magnetically deposited on said magnetizable blocks or strips in the waste water in the form of co-flocs of magnetic powder and suspended solids, and wherein said removing step comprises scraping off the co-flocs with scrapers after they have emerged from said waste water while carried on said blocks or strips, and separating and dropping said co-flocs into a chute when said non-magnetizable parts have arrived at the scrapers.

3. A method in accordance with claim 1 wherein said magnetic discs are arranged such that the lower portion thereof is immersed in the waste water in said tank while the upper portion thereof extends above the waste water level.

4. A waste water treatment apparatus, comprising:
a tank divided by a partition into a large chamber, for receiving the waste water which has had magnetic powder added thereto and has been subjected to a flocculation treatment, and a small chamber for separating magnetic powder from suspended solids;
a rotary shaft extending through both chambers of said tank;
a plurality of rotary magnetic discs connected to said shaft, a number of said magnetic discs being disposed in said large chamber and a smaller number being disposed in said small chamber;
scraper means disposed in close adjacency to each said rotary magnetic disc for scraping off material which has been deposited on the magnetic discs, such material being magnetic powder co-flocculated with suspended solids from the waste water on the discs in said large chamber and magnetic powder alone on the discs in said small chamber;
means for rotating said shaft carrying said rotary magnetic discs;
smashing tank means for destroying the co-flocs of magnetic powder and suspended solids by agitation;
means for directing the co-flocs scraped off by said scraper means adjacent said rotary discs in said large chamber into said smashing tank means; and
means for directing the deflocculated magnetic powder and suspended solids from said smashing tank means into said small chamber of said tank.

5. An apparatus in accordance with claim 4 wherein at least one of said rotary magnetic discs has magnetic strips embedded in the periphery thereof formed from several pieces of permanent magnets in side by side relation.

6. An apparatus in accordance with claim 4 wherein each of said rotary magnetic discs has magnetizable blocks or strips and non-magnetizable parts arranged alternately at the periphery thereof.

7. A waste water treatment apparatus in accordance with claim 6, wherein said rotating magnetic discs are composed of discs of non-magnetic material, in the periphery of which a plurality of magnetic plates are arranged at spaced intervals.

8. A waste treatment apparatus in accordance with claim 4, wherein at least one of said rotating magnetic discs has magnetic strips embedded in the periphery thereof composed of a plurality of magnetic blocks arranged side by side in contact with each other radiuswardly.

9. A waste water treatment apparatus in accordance with claim 4, wherein said rotary magnetic discs are composed of discs of magnetic material, in the periphery of which a plurality of non-magnetic plates are arranged at spaced intervals.

* * * * *